United States Patent
Hapamas et al.

(10) Patent No.: US 7,366,901 B2
(45) Date of Patent: Apr. 29, 2008

(54) DEVICE, SYSTEM, METHOD AND COMPUTER READABLE MEDIUM FOR IDENTIFYING AND AUTHENTICATING A CELLULAR DEVICE USING A SHORT-RANGE RADIO ADDRESS

(75) Inventors: Ziv Hapamas, Tel Aviv (IL); Amit Shachak, Petach Tikva (IL)

(73) Assignee: IXI Mobile (R&D), Ltd. (IL)

( * ) Notice: Subject to any disclaimer, the term of this patent is extended or adjusted under 35 U.S.C. 154(b) by 563 days.

(21) Appl. No.: 10/632,665

(22) Filed: Aug. 1, 2003

(65) Prior Publication Data

US 2005/0027982 A1    Feb. 3, 2005

(51) Int. Cl.
*H04L 9/00* (2006.01)
*H04K 1/00* (2006.01)
*H04K 1/02* (2006.01)
*H04M 1/68* (2006.01)
*H04M 1/66* (2006.01)
*H04M 3/16* (2006.01)
*H04B 7/00* (2006.01)
*H04B 1/00* (2006.01)
*H04B 15/00* (2006.01)
*H04Q 7/20* (2006.01)

(52) U.S. Cl. ............ 713/168; 380/247; 380/270; 713/155; 455/41.2; 455/411; 455/410; 455/517; 455/466

(58) Field of Classification Search ............ 713/168, 713/155; 380/247, 270; 455/410, 411, 41.2, 455/517, 466

See application file for complete search history.

(56) References Cited

U.S. PATENT DOCUMENTS 5,442,680 A    8/1995  Schellinger et al.

(Continued)

FOREIGN PATENT DOCUMENTS

JP    3153213    4/2001
WO    WO 99/48315    9/1999

OTHER PUBLICATIONS

Yee et al., "Integrating Bluetooth With Wireless And Ricocheting", pp. 1310-1314, 2000 IEEE.

(Continued)

*Primary Examiner*—Ayaz Sheikh
*Assistant Examiner*—Shin-Hon Chen
(74) *Attorney, Agent, or Firm*—Century IP Group, Inc.; F. Jason Far-hadian, Esq.

(57) ABSTRACT

A device, method, system and computer readable medium allows for using a short-range address, such as a Bluetooth™ address, to identify a cellular device and authenticate cellular messages to the cellular device. In an embodiment of the present invention, a first short-range radio address for a cellular device is stored in a processing device, such as a server coupled to a cellular network. An authentication message is obtained by the processing device. A second short-range radio address is stored in the cellular device. A first message digest is calculated responsive to the authentication message and first short-range radio address. A cellular message, including the authentication message and the first message digest, is transmitted to the cellular device. The cellular device receives the cellular message and calculates a second message digest responsive to the authentication message and the second short-range radio address stored in the cellular device. The cellular device authenticates the cellular message responsive to comparing the first message digest to a second message digest. In an alternate embodiment of the present invention, a processing device compares a second digest message from a cellular device and a first digest message calculated by the processing device in order authenticate the cellular message. In still a further embodiment of the present invention, a short-range radio address is used to encrypt and decrypt cellular messages.

26 Claims, 14 Drawing Sheets

U.S. PATENT DOCUMENTS

| | | |
|---|---|---|
| 5,457,737 A | 10/1995 | Wen |
| 5,572,528 A | 11/1996 | Shuen |
| 5,742,237 A | 4/1998 | Bledsoe |
| 5,771,438 A | 6/1998 | Palermo et al. |
| 5,774,791 A | 6/1998 | Strohallen et al. |
| 5,793,763 A | 8/1998 | Mayes et al. |
| 5,838,252 A | 11/1998 | Kikinis |
| 5,896,369 A | 4/1999 | Warsta et al. |
| 5,929,848 A | 7/1999 | Albukerk et al. |
| 5,978,386 A | 11/1999 | Hamalainen et al. |
| 5,987,011 A | 11/1999 | Toh |
| 5,987,033 A | 11/1999 | Boer et al. |
| 6,064,734 A | 5/2000 | Hasegawa et al. |
| 6,067,291 A | 5/2000 | Kamerman et al. |
| 6,069,896 A | 5/2000 | Borgstahl et al. |
| 6,078,789 A | 6/2000 | Bodenmann et al. |
| 6,085,098 A | 7/2000 | Moon et al. |
| 6,130,602 A | 10/2000 | O'Toole et al. |
| 6,151,628 A | 11/2000 | Xu et al. |
| 6,218,958 B1 | 4/2001 | Eichstaedt et al. |
| 6,223,029 B1 | 4/2001 | Stenman et al. |
| 6,243,581 B1 | 6/2001 | Jawanda |
| 6,265,788 B1 | 7/2001 | Davidson et al. |
| 6,282,183 B1 | 8/2001 | Harris et al. |
| 6,298,443 B1 | 10/2001 | Colligan et al. |
| 6,326,926 B1 | 12/2001 | Shoobridge |
| 6,333,973 B1 | 12/2001 | Smith et al. |
| 6,343,276 B1 | 1/2002 | Barnett |
| 6,434,537 B1 | 8/2002 | Grimes |
| 6,446,127 B1 | 9/2002 | Schuster et al. |
| 6,459,882 B1 | 10/2002 | Palermo et al. |
| 6,487,180 B1 | 11/2002 | Borgstahl et al. |
| 6,519,460 B1 | 2/2003 | Haartsen |
| 6,532,366 B1 | 3/2003 | Chung et al. |
| 6,600,428 B1 | 7/2003 | O'Toole et al. |
| 6,600,734 B1 | 7/2003 | Gernert |
| 6,630,925 B1 | 10/2003 | Ostergård et al. |
| 6,633,759 B1 | 10/2003 | Kobayashi |
| 6,636,489 B1 | 10/2003 | Fingerhut |
| 6,665,549 B1 | 12/2003 | Reed |
| 2002/0037700 A1 | 3/2002 | Dooley et al. |
| 2002/0055333 A1 | 5/2002 | Davies et al. |
| 2002/0058502 A1 | 5/2002 | Stanforth |
| 2002/0065817 A1 | 5/2002 | Ito et al. |
| 2002/0068559 A1 | 6/2002 | Sharma et al. |
| 2002/0068600 A1 | 6/2002 | Chihara et al. |
| 2002/0069037 A1 | 6/2002 | Hendrickson et al. |
| 2002/0082054 A1 | 6/2002 | Keinonen et al. |
| 2002/0086718 A1 | 7/2002 | Bigwood et al. |
| 2002/0091633 A1 | 7/2002 | Proctor |
| 2002/0102974 A1 | 8/2002 | Raith |
| 2002/0118663 A1 | 8/2002 | Dorenborsch et al. |
| 2002/0126845 A1* | 9/2002 | Hue et al. .................. 380/247 |
| 2002/0128051 A1 | 9/2002 | Liebenow |
| 2002/0142762 A1 | 10/2002 | Chmaytelli et al. |
| 2002/0143952 A1 | 10/2002 | Sugiarto et al. |
| 2002/0155830 A1 | 10/2002 | Iyer |
| 2002/0160764 A1 | 10/2002 | Gorsuch |
| 2003/0013438 A1 | 1/2003 | Darby |
| 2003/0017810 A1 | 1/2003 | Janninck et al. |
| 2003/0027563 A1 | 2/2003 | Herle et al. |
| 2003/0032417 A1 | 2/2003 | Minear et al. |
| 2003/0050058 A1 | 3/2003 | Walsh et al. |
| 2003/0060188 A1 | 3/2003 | Gidron |
| 2003/0060189 A1 | 3/2003 | Minear et al. |
| 2003/0078036 A1 | 4/2003 | Chang et al. |
| 2003/0091917 A1 | 5/2003 | Davenport et al. |
| 2003/0115351 A1 | 6/2003 | Giobbi |
| 2003/0122856 A1 | 7/2003 | Hubbard |
| 2003/0153280 A1 | 8/2003 | Kopp et al. |
| 2003/0187807 A1 | 10/2003 | Matsubara et al. |
| 2003/0194090 A1 | 10/2003 | Tachikawa |
| 2003/0214940 A1 | 11/2003 | Takken |
| 2003/0224773 A1 | 12/2003 | Deeds |
| 2003/0232616 A1 | 12/2003 | Gidron et al. |
| 2004/0048671 A1 | 3/2004 | Rowe |
| 2004/0203354 A1* | 10/2004 | Yue .......................... 455/41.1 |
| 2004/0203372 A1* | 10/2004 | Morimoto ................. 455/41.2 |
| 2004/0203384 A1* | 10/2004 | Sugikawa et al. ......... 455/41.2 |
| 2004/0203950 A1* | 10/2004 | Chen .......................... 455/466 |
| 2005/0130627 A1* | 6/2005 | Calmels et al. ............. 455/411 |
| 2006/0046664 A1 | 3/2006 | Paradiso et al. |
| 2006/0148402 A1* | 7/2006 | Hagiwara ................. 455/41.1 |

OTHER PUBLICATIONS

Haartsen, "BLUETOOTH—The universal radio interface for ad hoc wireless connectivity", pp. 110-117, Ericsson Review No. 3, 1998.

Guthery et al., "The WebSIM—Clever Smartcards Listen to Port 80", version 15.12.99.

Project P946-GI, Smart Devices "When Things Start to Think", Jan. 2000, 2000 EURESCOM Participants in Project P946-GI.

White Paper, Handheld Devices: Comparing the Major Platforms, www.dell.com/r&d, Dec. 2000.

Miyatsu, Bluetooth Design Background and Its Technological Features, IEICE Trans, Fundamentals, vol. E83-A, No. 11, Nov. 2000.

Parekh, Operating Systems on Wireless Handheld Devices, A Strategic Market Analysis, Massachusettes Institute of Technology, Sep. 28, 2000.

Johansson, et al., Short Range Radio Based Ad-hoc Netowrking: Performance and Properties, IEEE, 1999.

* cited by examiner

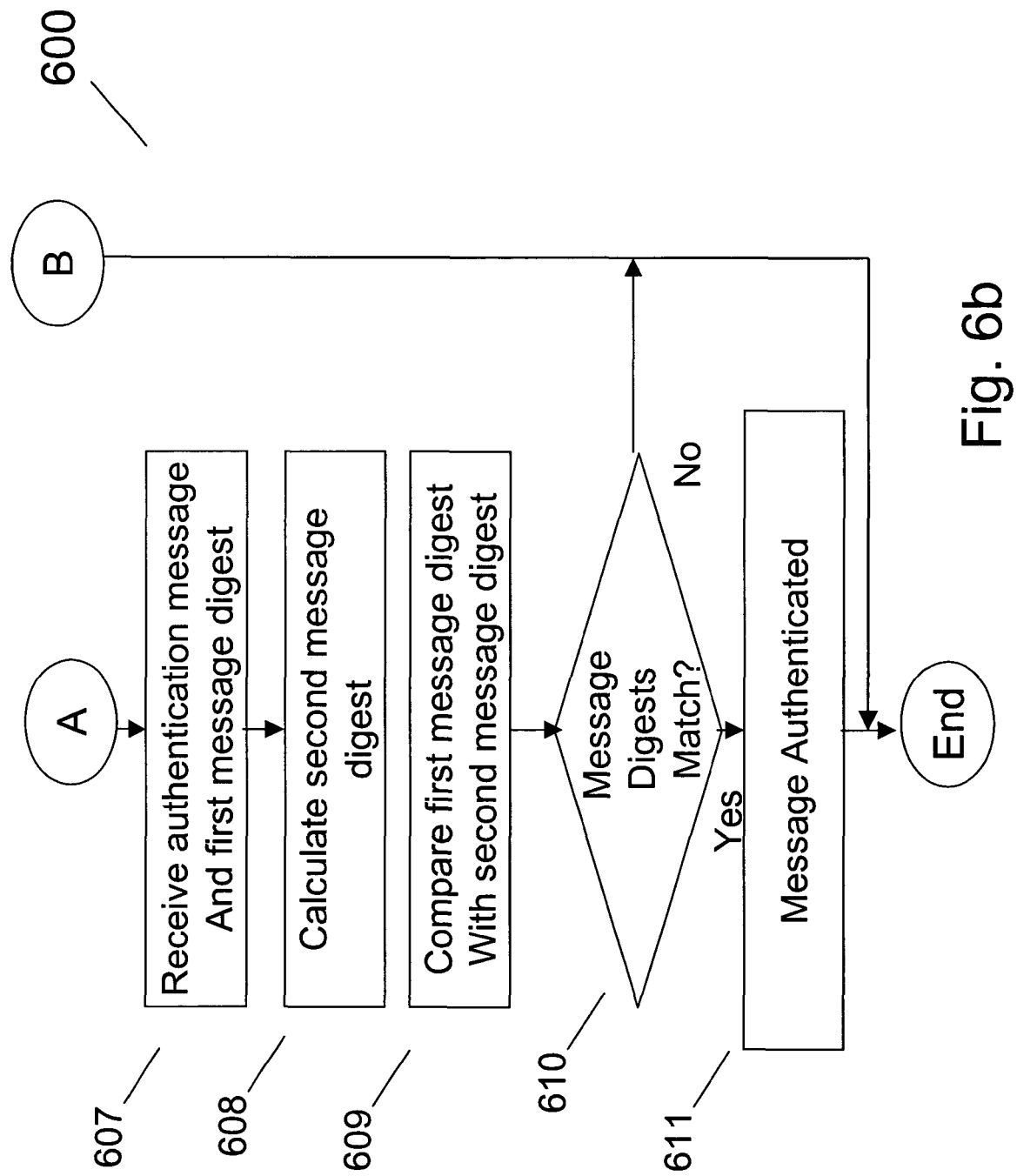

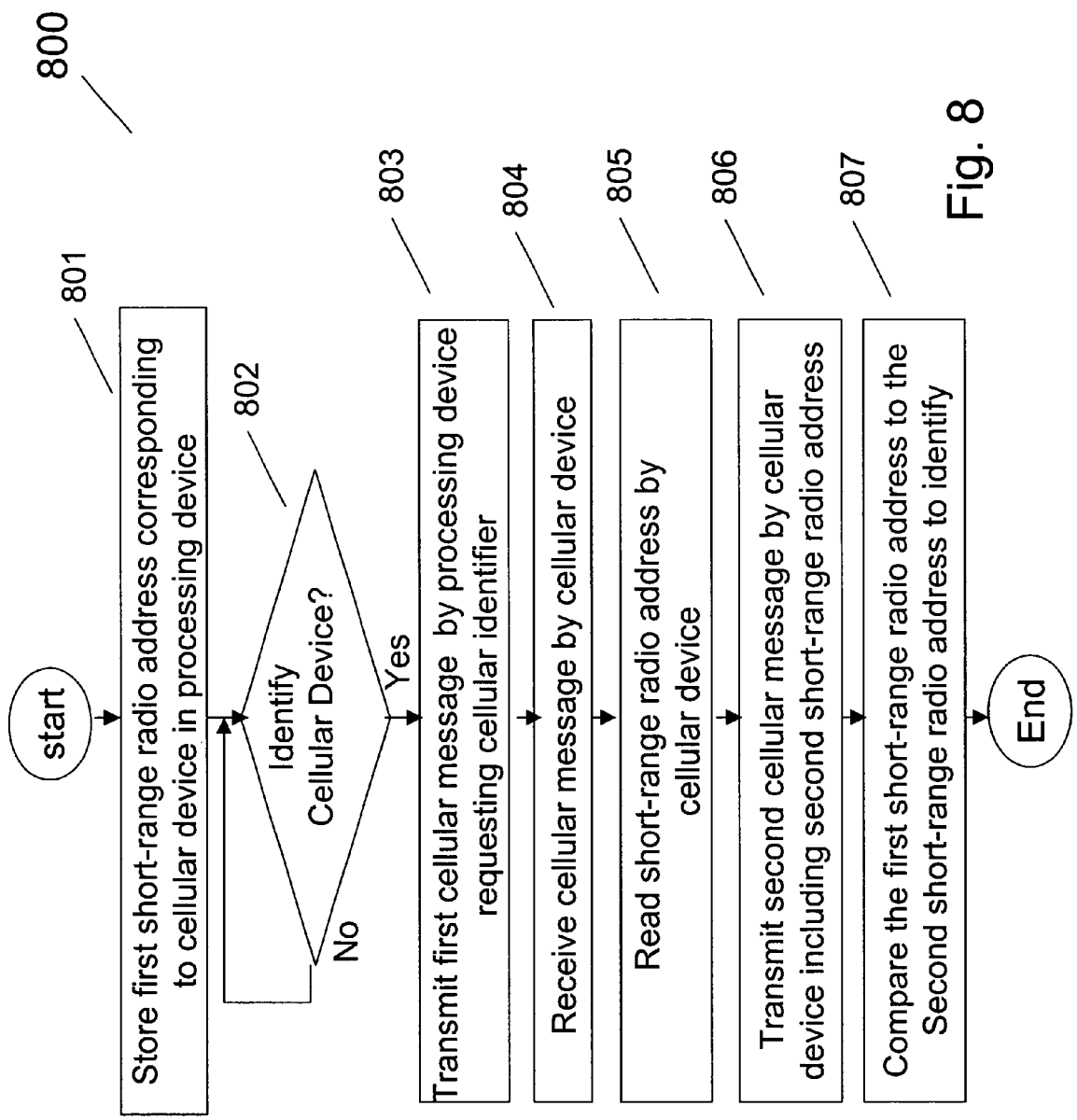

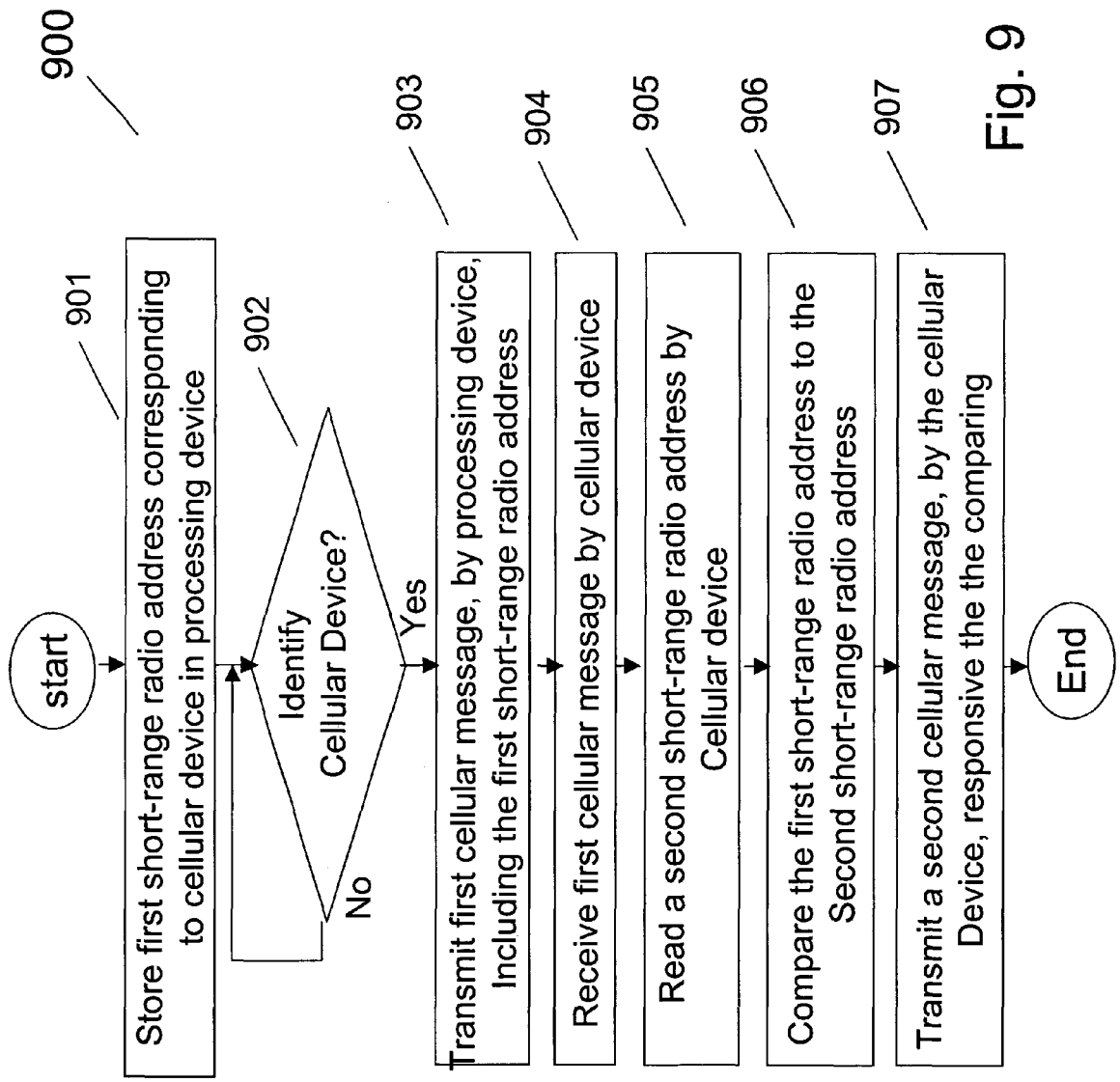

DEVICE, SYSTEM, METHOD AND COMPUTER READABLE MEDIUM FOR IDENTIFYING AND AUTHENTICATING A CELLULAR DEVICE USING A SHORT-RANGE RADIO ADDRESS

FIELD OF THE INVENTION

This invention relates generally to networks.

BACKGROUND OF THE INVENTION

Cellular networks, such as a Global System for Mobile Communications ("GSM") network or Universal Mobile Telecommunications System ("third-generation (3G)") network, include cellular devices, such as cellular telephones, that must be uniquely identified and authenticated. Management software requires device unique identifiers in order to communicate with or load the appropriate device software. Likewise, cellular networks, and in particular operators of cellular networks must authenticate cellular devices in order to ensure that the device has been authorized to join the cellular network or has not been stolen.

A GSM cellular network identifies a cellular device by an International Mobile Equipment Identity ("IMEI") number. The IMEI number is not transferred over air or transmitted by radio frequency. Other cellular networks use different methods of uniquely identifying a cellular device. So in order for management software executing on a processing device, such as a server, to communicate with the cellular device, by way of the GSM network, the server must communicate with the GSM network and use the IMEI number.

However, integrating a server with a GSM cellular network in order to communicate with a cellular device is a time-consuming and complex task. Large amounts of time and engineering-hours must be used to write, test and debug management software on a server in order to use the IMEI number in communicating with the GSM cellular network, and in particular with the identified cellular device.

Similarly, additional management software must be written, tested and debugged for different cellular networks using a different method of identification.

Therefore, it is desirable to provide a device, system, method and computer readable medium for communicating with a cellular device, and in particular uniquely identifying a cellular device or authenticating a cellular message, without designing and testing a complex software interface to a particular cellular network. Further, it is desirable to provide a device, system, method and computer readable medium that allows for easily obtaining a unique identifier from the cellular device, regardless of which cellular network the cellular device is operating in.

SUMMARY

A device, method, system and computer readable medium allows for using a short-range address, such as a Bluetooth™ address, to identify a cellular device and authenticate cellular messages to the cellular device.

In an embodiment of the present invention, a first short-range radio address for a cellular device is stored in a processing device, such as a server coupled to a cellular network. An authentication message is likewise stored in the processing device. A second short-range radio address is stored in the cellular device. A first message digest is calculated responsive to the authentication message and first short-range radio address. A cellular message, including the authentication message and the first message digest, is transmitted to the cellular device. The cellular device receives the cellular message and calculates a second message digest responsive to the authentication message and the second short-range radio address stored in the cellular device. The cellular device authenticates the cellular message responsive to comparing the first message digest to a second message digest.

In an embodiment of the present invention, a first short-range radio address for a cellular device is stored in a processing device. An authentication message is obtained in the processing device. A second short-range radio address is stored in the cellular device, wherein the first short-range radio address and the second short-range radio address are the same. The processing device calculates a first message digest responsive to the authentication message and first short-range radio address. A cellular network coupled to the processing device, transmits a cellular message including the authentication message to the cellular device. The cellular device receives the cellular message. The cellular device responsive to the authentication message and the second short-range radio address calculates a second message digest. The cellular device transmits the second message digest. The processing device compares the first message digest to a second message digest to authenticate the cellular message.

In an embodiment of the present invention, a short-range radio address is used to encrypt and decrypt a cellular message.

In an embodiment of the present invention, the authentication message is randomly generated.

In an embodiment of the present invention, the first message digest is a 128-bit value calculated by a one-way hash software component, such as a MD5 software component.

In an embodiment of the present invention, the cellular device is a cellular telephone having a short-range radio transceiver.

In an embodiment of the present invention, a cellular device receives a first cellular message requesting a cellular device identifier. The cellular device reads a first short-range radio address from the cellular device and transmits a second cellular message including the first short-range radio address. The first short-range radio address is compares to a second short-range radio address stored in a processing device to identify the cellular device.

In an embodiment of the present invention, a device comprises a cellular transceiver capable to receive a first cellular message and a first processor coupled to the cellular transceiver. A first memory is coupled to the first processor and capable to store a first software component for generating a command responsive to the first cellular message. A second processor is coupled to the first processor and a short-range radio transceiver. A second memory is coupled to the second processor and capable to store a second software component for retrieving a short-range radio address associated with the short-range radio transceiver responsive to the command. The first software component authenticates the first cellular message using the short-range radio address.

In an embodiment of the present invention, the cellular transceiver generates a second cellular message including the short-range radio address to identify the device.

In an embodiment of the present invention, the device is a hand-held device communicating with a cellular network coupled to a processing device.

An article of manufacture, including a computer readable medium, in a device is provided in another embodiment of the present invention. A cellular software component executes a first instruction responsive to a first cellular message from a cellular network. A short-range radio software component provides a short-range radio address responsive to executing the first instruction and the cellular software component authenticates the first cellular message using the short-range radio address.

Other aspects and advantages of the present invention can be seen upon review of the figures, the detailed description, and the claims that follow.

BRIEF DESCRIPTION OF THE DRAWINGS

FIGS. 6a-b, 7a-b, 8, 9, 10 and 11 are flowcharts of methods according to embodiments of the present invention.

DETAILED DESCRIPTION

I. System Overview

Figure 1:
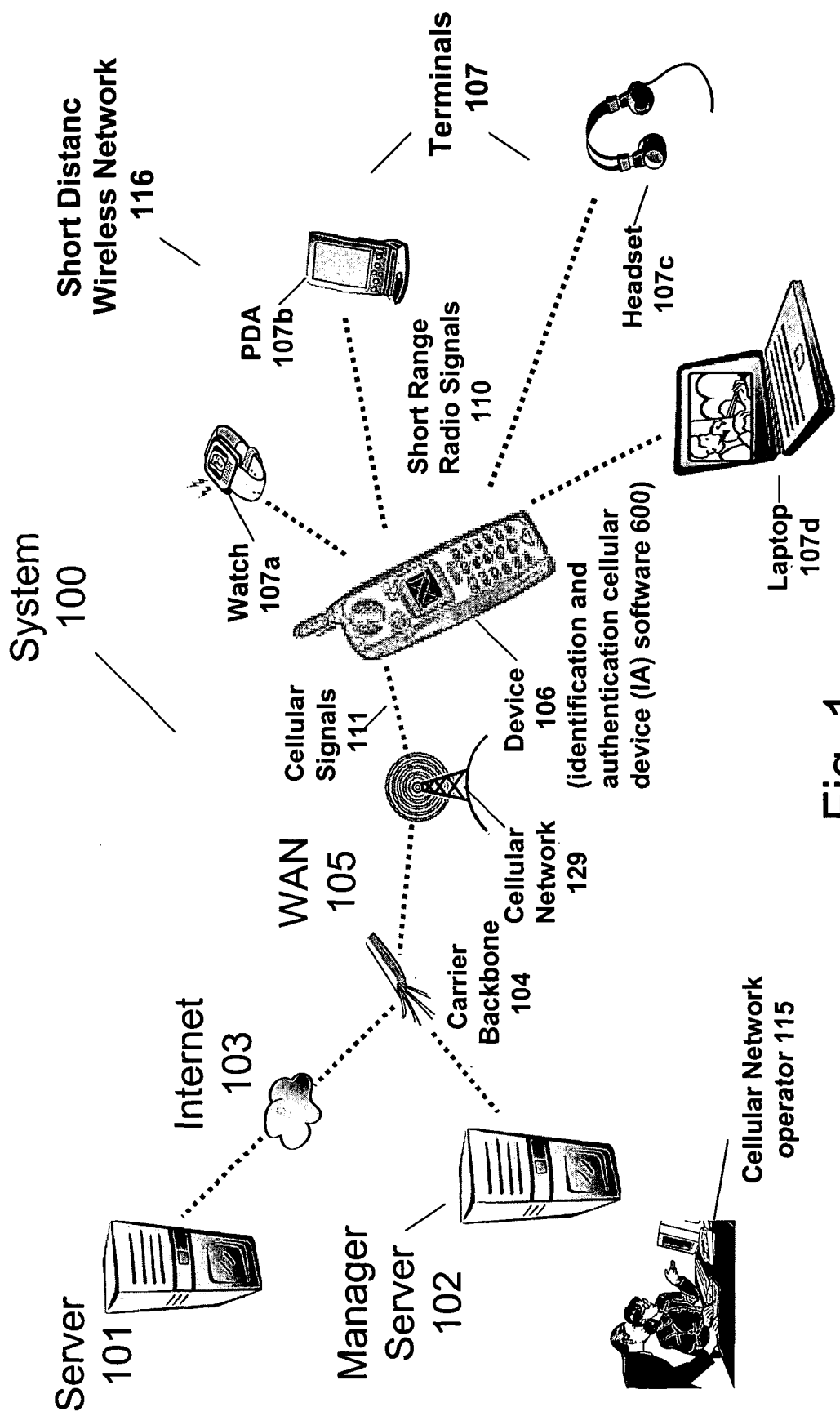
FIG. 1 illustrates a system according to an embodiment of the present invention.

The following description and claims relate to a device, method, system, and computer readable medium for authenticating a cellular message and identifying a cellular device in a cellular network. In an embodiment of the present invention, a device 106 stores and executes Identification and Authentication Cellular Device ("IA") software component 600 and Manager server 102 stores and executes Manager software 550 in order to authenticate cellular messages and identify a cellular device 106 as seen in FIG. 1. In an embodiment of the present invention, a short-range radio address BD_ADDR 601 for a short-range transceiver 309 in cellular device 106 is used to authenticate cellular messages, encrypt/decrypt cellular messages and/or identify the cellular device. Manager server 102 stores short-range radio addresses, such as Bluetooth™ addresses, associated with respective cellular devices authorized to be in cellular network 129. The stored short-range radio addresses in Manager server 102 and the short-range radio addresses stored in the respective cellular devices are then used to authenticate cellular messages and identify an authorized cellular device in a cellular network 129. In an embodiment of the present invention, the short-range radio addresses and an authentication message are used to provide a digital signature, such as a message digest or fingerprint. In an alternate embodiment of the present invention, short-range radio addresses are used to encrypt and/or decrypt cellular messages transmitted between a cellular device and a processing device in a cellular network.

In an embodiment of the present invention, a short distance wireless network is a network of processing devices, such as a personal computer or headset, that span a relatively small physical area, wherein at least one device generates and receives a short-range radio signal for communicating with another device in the network. In an embodiment of the present invention, a short-range radio signal can travel between approximately 0 and approximately 1000 feet. An example of a short distance wireless network includes a network of devices formed by Bluetooth™, HomeRF, 802.11 technologies, or an equivalent, singly or in combination. In an embodiment of the present invention, each processing device in a short distance wireless network has its own processing unit that executes a software component stored on the processing device memory, but also may access data and devices on the short distance wireless network. In an embodiment of the present invention, a wire, and in particular an Ethernet, provides communication between two or more processing devices in a short distance wireless network. In an alternate embodiment, electromagnetic signals provide wireless communication between one or more processing devices in a short distance wireless network. In still another embodiment, both wires and electromagnetic signals provide communication between processing devices in a short distance wireless network.

In an embodiment of the present invention, a WAN includes multiple local area networks ("LANs") and/or short distance wireless networks connected over a relatively large distance. Telephone lines and electromagnetic signals, singly or in combination, couple the LANs and/or short distance wireless networks in a WAN. In an embodiment of the present invention, WAN 105 includes a cellular network 129 generating and receiving cellular signals 111. In an embodiment of the present invention, cellular network 129 includes a cellular data service, such as GPRS, for providing data packets. In an embodiment of the present invention, a cellular network is defined as a communication system dividing a geographic region into sections, called cells. In an analog embodiment of the present invention, the purpose of this division is to make the most use out of a limited number of transmission frequencies. In an analog embodiment of the present invention, each connection, or for example conversation, requires its own dedicated frequency, and the total number of available frequencies is about 1,000. To support more than 1,000 simultaneous conversations, cellular systems allocate a set number of frequencies for each cell. Two cells can use the same frequency for different conversations so long as the cells are not adjacent to each other.

Figure 3A:
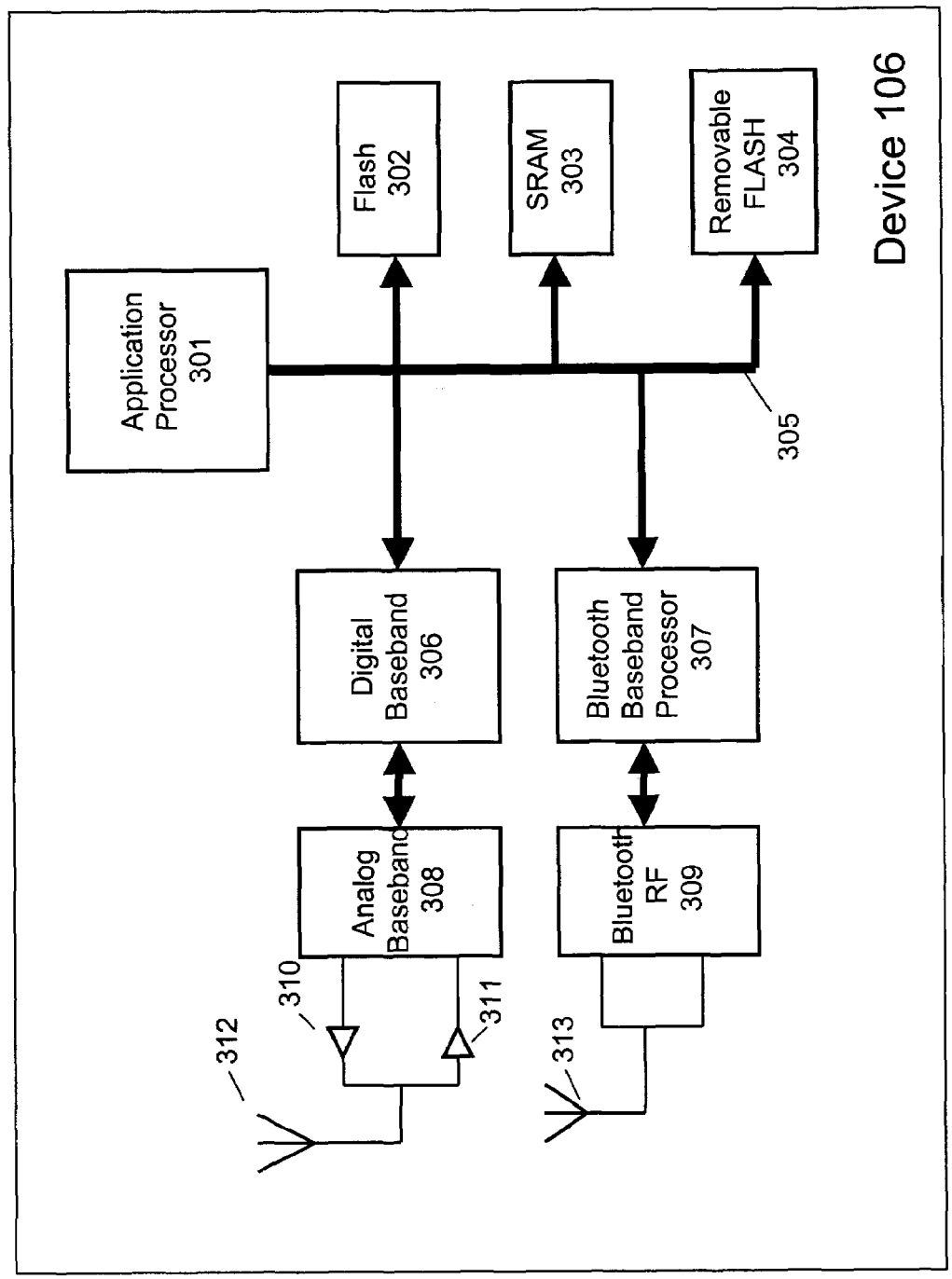
FIGS. 3a-b are hardware block diagrams of a wireless device and a wireless hand-held device according to an embodiment of the present invention.
Figure 3B:
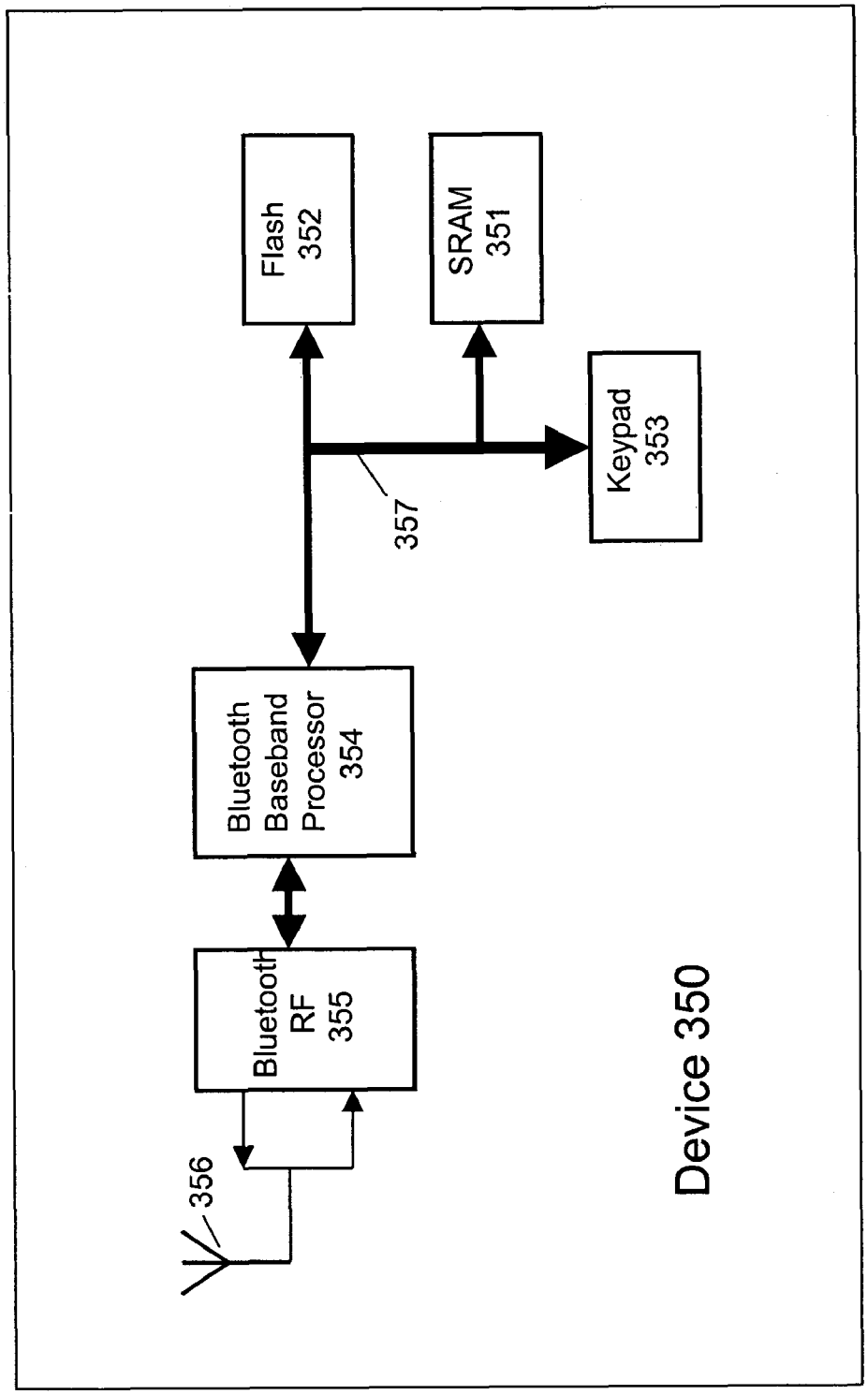

FIG. 1 illustrates system 100 according to an embodiment of the present invention. System 100 includes other devices or terminals 107 coupled to wireless device 106. In an embodiment of the present invention, device 106 and one or more terminals 107 communicate to form a short distance wireless network 116. In an embodiment of the present invention, terminals 107 are coupled to device 106 by short-range radio signals 110 to form short distance wireless network 116. In an embodiment of the present invention, some or all of terminals 107 may have wired connections. In an embodiment of the present invention, terminals 107 include a watch 107a, PDA 107b, headset 107c and laptop computer 107d that generate respective output signals. In an alternate embodiment, fewer or more terminals are used in short distance wireless network 116. In an alternate embodiment, terminals 107 include a desktop computer, a pager, a pen, a printer, a watch, a thin terminal, a messaging terminal, a digital camera or an equivalent. In an embodiment of the present invention, terminals 107 include a Bluetooth™ 2.4 GHz transceiver. Likewise, device 106 includes a Bluetooth™ 2.4 GHZ transceiver. In an alternate embodiment of the present invention, a Bluetooth™ 5.7 GHZ transceiver is used. Hardware for device 106 and terminals 107 are illustrated in FIGS. 3a-b in an embodiment of the present invention.

In alternate embodiments of the present invention, other local wireless technologies, such as 802.11 or HomeRF signals, are used to communicate between device 106 and terminals 107.

In an embodiment of the present invention, WAN 105 is coupled to device 106. In an embodiment of the present invention, WAN 105 includes a cellular network 129 transmitting and receiving cellular signals 111. In an embodiment of the present invention, cellular signals 111 are transmitted using a protocol, such as a GSM protocol with a GPRS. In alternate embodiments, a Code Division Multiple Access ("CDMA"), CDMA 2000, Universal Mobile Telecommunications System ("UMTS"), Time Division Multiple Access ("TDMA"), or 3G protocols or an equivalent is used.

In an embodiment of the present invention, WAN 105 includes carrier backbone 104, servers 101-102 and Internet 103. In an embodiment of the present invention, IP packets are transferred between the components illustrated in FIG. 1. In alternate embodiments of the present invention, other packet types are transferred between the components illustrated in FIG. 1. In an embodiment of the present invention, a packet includes predetermined fields of information, such as header field and data field. A header field may include information necessary in transferring the packet, such as a source IP address.

In an embodiment of the present invention, WAN 105 includes an IP public or private network, such as a corporate secured network using a Virtual Private Network ("VPN").

In an alternate embodiment of the present invention, device 106 is coupled to WAN 105 by an Ethernet, Digital Subscriber Line ("DSL"), or cable modem connection, singly or in combination.

In an embodiment of the present invention, device 106 is a cellular handset or telephone. In an alternate embodiment of the present invention, device 106 is a cellular enabled PDA, wireless modem and/or wireless laptop computer.

In an embodiment of the present invention, WAN 105 is coupled to a wireless carrier internal network or carrier backbone 104. In an embodiment of the present invention, Manager server 102 is coupled to carrier backbone 104. In an alternate embodiment of the present invention, carrier backbone 104 is coupled to Internet 103. Server 101 is coupled to Internet 103. In an embodiment of the present invention, servers 101 and 102 provide information, such as web pages or application software components, to terminals 107 by way of device 106. In an embodiment of the present invention, Manager server 103 and Manager software component 550 is used to authenticate cellular messages and identify cellular devices. In an embodiment of the present invention, Manager server 102 provides a microrouter 404 and/or network service plug-ins 406*a-k* to device 106, as described below. Further, Manager server 102, monitors applications and terminals in a short distance wireless network 116. In an embodiment of the present invention, terminals 107 share services and communicate by way of device 106.

II. Hand-held Device/Terminal Hardware

Figure 2:
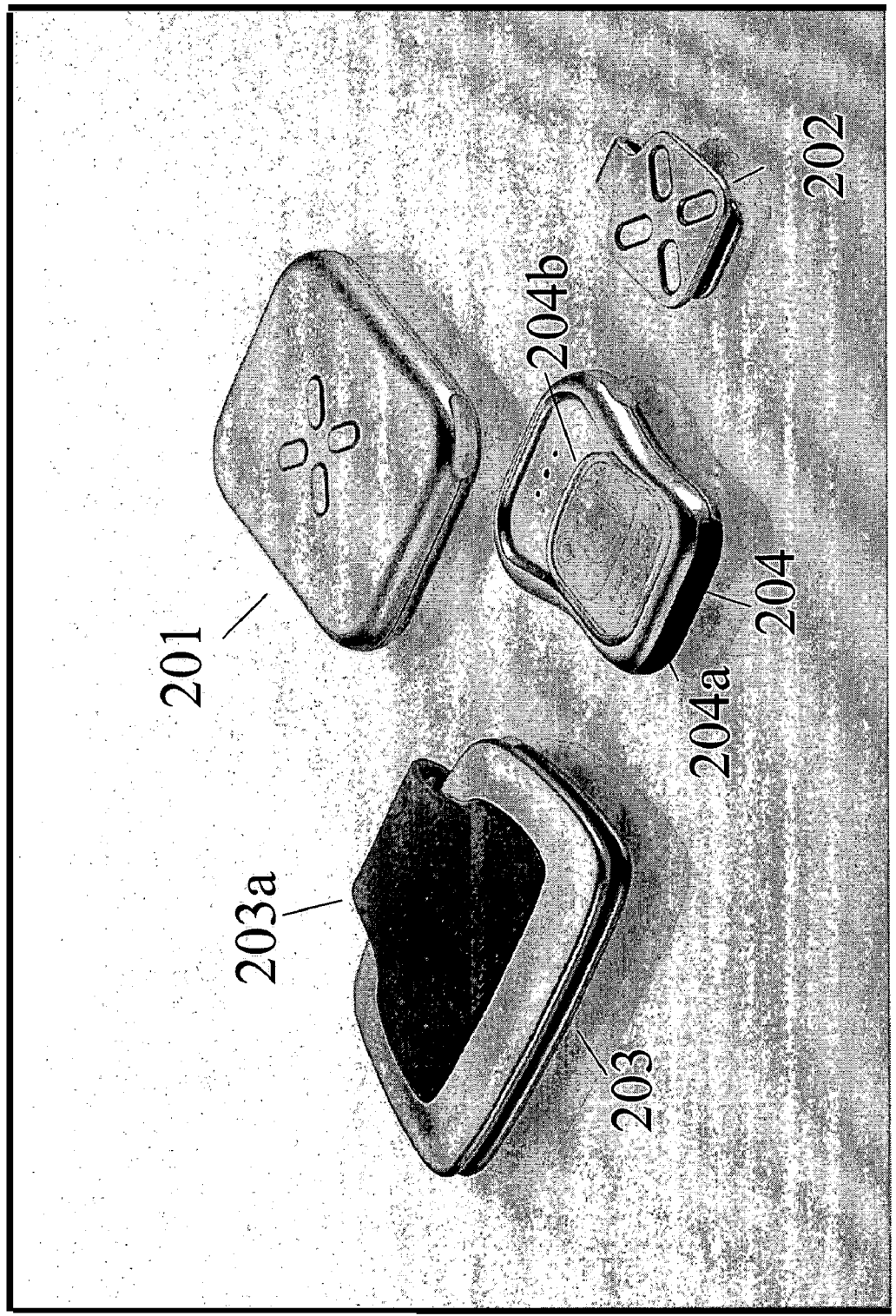
FIG. 2 illustrates thin terminals and a wireless device according to an embodiment of the present invention.

FIG. 2 illustrates embodiments of terminals 107 and device 106. In an embodiment of the present invention, there are two types of terminals: 1) smart terminals and 2) thin terminals. In an alternate embodiment of the present invention, smart terminals execute user logic and applications. Smart terminals have a relatively powerful processing unit, operating system and applications. Their main needs from a short distance wireless network 116 are access to a WAN 105 through TCP/IP and other network services such as storage and execution. For example, a laptop computer 107*d* and PDA 107*b* are smart terminals. Thin terminals have a relatively low power processing unit and operating system. They are mainly used as peripherals to an application server in a short distance wireless network 116 and their main task is user interaction, rendering output for a user and providing an application server with a user's input. For example, a watch 107*a* or messaging terminals can be thin terminals.

FIG. 2 illustrates thin terminals. Voice terminal 204 includes a display 204*b* and a retractable keypad 204*a*. Messaging Terminal 203 is illustrated in a closed position with a hinge 203*a* used to open and close terminal 203. Terminal 203 also includes a miniature QWERTY keyboard and display when opened.

In an embodiment of the present invention, device 201 is a cellular modem and includes a clip 202 for a belt.

FIG. 3*a* illustrates a hardware block diagram of device 106 in an embodiment of the present invention. Device 106 includes both internal and removable memory. In particular, device 106 includes internal FLASH (or Electrically Erasable Programmable Read-Only Memory ("EEPROM") and Static Random Access Memory ("SRAM") 302 and 303, respectively. Removable FLASH memory 304 is also used in an embodiment of the present invention. Memories 302, 303, and 304 are coupled to bus 305. In an embodiment of the present invention, bus 305 is an address and data bus. Application processor 301 is likewise coupled to bus 305. In an embodiment of the present invention, processor 301 is a 32-bit processor. Bluetooth™ processor 307 is also coupled to bus 305. Bluetooth™ RF circuit 309 is coupled to Bluetooth™ processor 307 and antenna 313. Processor 307, RF circuit 309 and antenna 313 transmit and receive short-range radio signals to and from terminals 107, illustrated in FIG. 1, or device 350, illustrated in FIG. 3*b*. Bluetooth RF circuit 309 and antenna 313 is also known as a short-range radio transceiver.

Cellular, such as GSM, signals are transmitted and received using digital circuit 306, analog circuit 308, transmitter 310, receiver 311 and antenna 312. Analog circuit 308, transmitter 310, receiver 311 and antenna 312 is also known as a cellular transceiver. Digital circuit 306 is coupled to bus 305. In alternate embodiments, device 106 includes a display, a speaker, a microphone, a keypad and a touchscreen, singly or in combination.

In a preferred embodiment of the present invention, device 106 has a dual bus architecture where a first processor is coupled to a cellular transceiver by a first bus and a second processor is coupled to a short-range transceiver by a second bus. In an embodiment, a third bus couples the first and second processors. In an embodiment of the present invention, a first memory is coupled to the first bus and a second memory is coupled to the second bus.

FIG. 3*b* illustrates device 350 that is a hand-held device in an embodiment of the present invention. Device 350, in an embodiment of the present invention, is one of the terminals 107 illustrated in FIG. 1. Similar to device 106, device 350 includes SRAM and FLASH memory 351 and 352, respectively. Memories 351 and 352 are coupled to bus 357. In an embodiment of the present invention, bus 357 is an address and data bus. Keypad 353 is also coupled to bus 357. Short-range radio signals are transmitted and received using Bluetooth™ processor 354 and Bluetooth™ RF circuit 355. Antenna 356 is coupled to Bluetooth™ RF circuit 355. In an embodiment of the present invention, antenna 356 transmits and receives short-range radio signals. In alternate embodiments, device 350 includes a display, a speaker, a microphone, a keypad and a touchscreen, singly or in combination. As one of ordinary skill in the art would appreciate, other hardware components would be provided for device 350 in alternate embodiments of the present invention. For example in an embodiment in which device 350 is a laptop computer 107d, a disk drive and other input/output components are present.

In a preferred embodiment of the present invention, device 350 likewise has a dual bus architecture where a first processor is coupled to a first bus and a second processor is coupled to a short-range transceiver by a second bus. In an embodiment, a third bus couples the first and second processors. In an embodiment of the present invention, a first memory is coupled to the first bus and a second memory is coupled to the second bus.

III. Software

Figure 4:
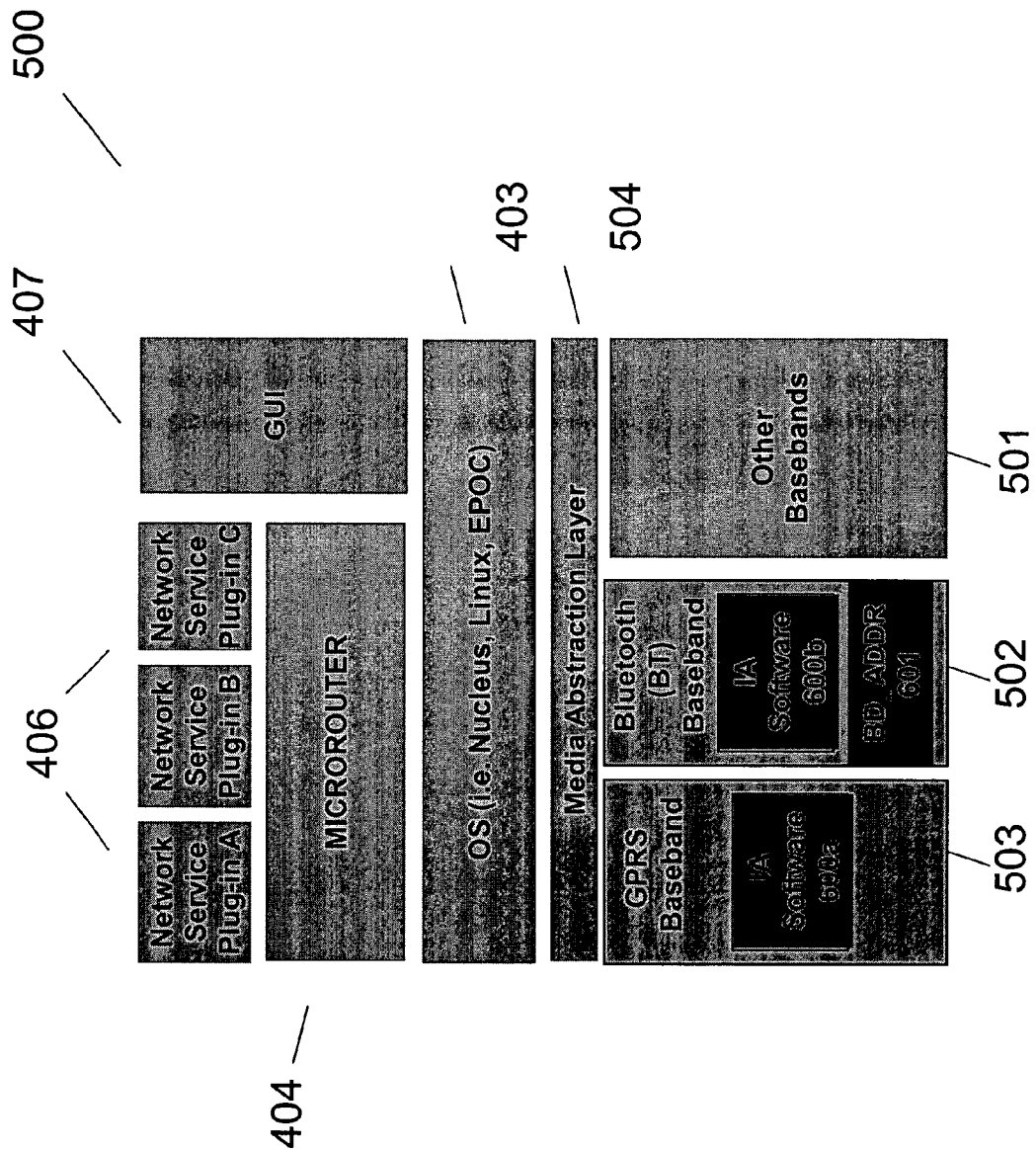
FIG. 4 is a software block diagram for a wireless device according to an embodiment of the present invention.
Figure 5:
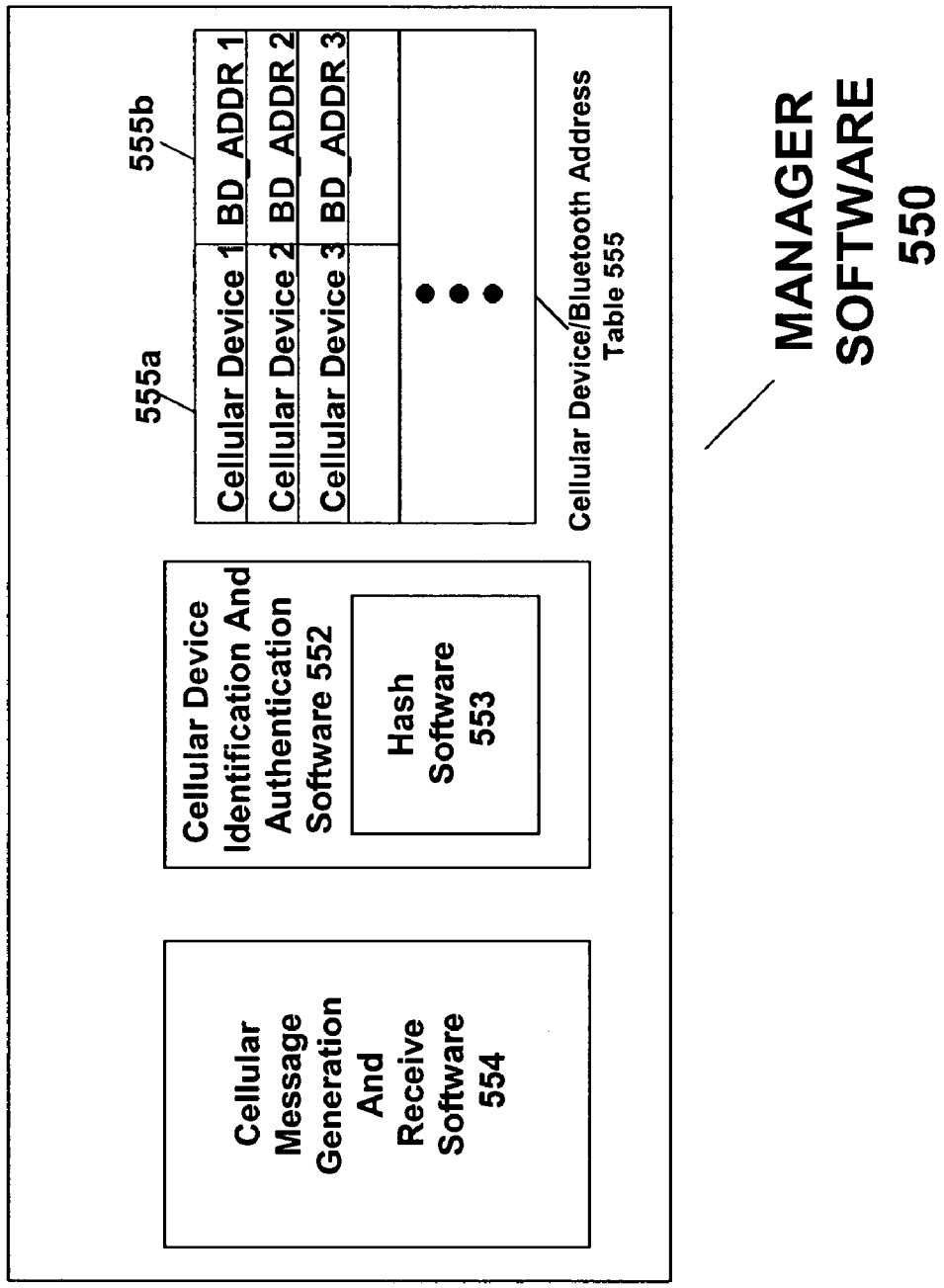
FIG. 5 is a software block diagram of Manager software component 550 stored in Manager server 102 illustrated in FIG. 1 according to an embodiment of the present invention.

FIG. 4 illustrates a software architecture 500 for device 106 illustrated in FIG. 3a according to an embodiment of the present invention. In an embodiment of the present invention, software 500 is stored in FLASH memory 302. In an embodiment of the present invention, software components referenced in FIGS. 4-5 represent a software program, a software object, a software function, a software subroutine, a software method, a software instance, and a code fragment, singly or in combination. In an alternate embodiment, functions performed by software components illustrated in FIGS. 4-5 are carried out completely or partially by hardware.

In an embodiment of the present invention, software 500, or components of software 500, is stored in an article of manufacture, such as a computer readable medium. For example, software 500 is stored in a magnetic hard disk, an optical disk, a floppy disk, Compact Disk Read-Only Memory ("CD-ROM"), Random Access Memory ("RAM"), Read-Only Memory ("ROM"), or other readable or writeable data storage technologies, singly or in combination. In yet another embodiment, software 500, or components thereof, is downloaded from Manager server 102 illustrated in FIG. 1.

Software 500 includes telecommunication software or physical layer protocol stacks, in particular cellular communication software component 503 and short-range radio communication software component 502. In an embodiment, cellular communication software component 503 is a GSM/GPRS baseband software component used with processor 306 to transmit and receive cellular signals including cellular messages. In an embodiment, short-range communication software 502 is a Bluetooth™ ("BT") baseband software component used with processor 307 to transmit and receive short-range radio signals. Other telecommunication software may be used as illustrated by other basebands 501.

In an alternate embodiment of the present invention, cellular communication software component 503 and short-range radio communication software component 502 are stored in flash memory 302. As one of ordinary skill in the art would appreciate, in alternate embodiments of the present invention cellular communication software component 503 and short-range radio communication software component 502 is stored in a single memory or in respective memories coupled to respective buses.

In an embodiment of the present invention, short-range radio software component 502 includes IA software component 600b and short-range radio address BD_ADDR 601 associated with short-range radio transceiver in device 106. In an alternate embodiment of the present invention, BD_ADDR 601 is stored in hardware or silicon of a short-range transceiver in device 106 and read by IA software component 600b. BD_ADDR 601 is used as a unique identifier for cellular device 106 and may be used to identify cellular device 106 when used in different cellular networks because there is only one short-range transceiver in device 106. In an embodiment of the present invention, a short-range radio address ("BD_ADDR") is a 48-bit value consisting of a lower address part including 24 bits assigned by a business entity, an upper address part including 8 bits identifying a business entity and a non-significant address part consisting of 16 bits. IA software component 600b is responsible for retrieving the short-range radio address BD_ADDR 601 responsive to a processor readable instruction in IA software component 600a described below.

In an embodiment of the present invention, cellular communication software component 503 includes IA software component 600a responsible for determining the contents of a cellular message received from cellular network 129. For example, IA software component 600a determines whether a received cellular message includes an authentication message and message digest, a request for a cellular device identifier for device 106, or a short-range radio address for identifying device 106. IA software component 600a is also responsible for retrieving a short-range radio address BD_ADDR 601 from short-range radio communication software component 502. IA software component 600a is also responsible for causing cellular communication software component 503 to generate a cellular message, including a retrieved short-range radio address BD_ADDR 601 or other information, by way of a cellular transceiver and cellular network 129 to Manager server 102.

In an embodiment of the present invention, IA software component 600a includes an Encryption/Decryption software component to encrypt and decrypt, respectively, cellular messages using a shared key, such as a short-range radio address in processing device 106 and a short-range radio address likewise stored in a processing device coupled to cellular network 129, such as Manager server 102. In an embodiment of the present invention, the short-range radio address stored in the cellular device and the processing device are the same or identical addresses.

In an embodiment of the present invention, IA software component 600a includes a processor readable instruction for retrieving short-rang radio address BD_ADDR 601. In an embodiment of the present invention, the instruction is a Host Controller Interface ("HCI") command, such as a HCI_Read_BD_ADDR command. In an alternate embodiment of the present invention, IA software component 600a includes a function call, such as a void hciREADBDAddr (BD_ADDR*bd_addr) to retrieve short-range radio adrs 601 from short-range communication software 502.

In an embodiment of the present invention, IA software component 600a includes a one-way hash software component, such as MD5 software component, used to calculate a message digest from a received authentication message and a retrieved short-range radio address adrs 601. The calculated message digest is then compared by IA software component 600a to the message digest in a received cellular message to authenticate the received cellular message.

In an embodiment of the present invention, operating system ("OS") 403 is used to communicate with telecommunication software 502 and 503. In an embodiment of the present invention, operating system 403 is a Linux operating system, EPOC operating system available from Symbian software of London, United Kingdom or a PocketPC or a Stinger operating system available from Microsoft® Corporation of Redmond, Wash. or Nucleus operating system, available from Accelerated Technology, Inc. of Mobile, Ala. Operating system 403 manages hardware and enables execution space for device software components.

Media abstraction layer 504 allows operating system 403 to communicate with basebands 503, 502 and 501, respectively. Media abstraction layer 504 and other abstraction layers, described herein, translate a particular communication protocol, such as GPRS, into a standard command set used by a device and/or terminal. The purpose of an abstraction layer is to isolate the physical stacks from the rest of the device software components. This enables future usage of different physical stacks without changing any of the upper layer software and allows the device software to work with any communication protocol.

Furthermore, Graphics User Interface ("GUI") 407 is provided to allow a user-friendly interface.

Microrouter 404 and network service plug-in 406 enables an IP based network or enhanced IP based network, respectfully.

Microrouter 404 enables an IP based network between device 106 and terminals 107. In an embodiment of the present invention, each terminal can leverage the existing IP protocol, exchange information with other terminals and gain access to a WAN through microrouter 404. Extended network services, such as network service plug-ins 406, may be added to microrouter 404. In an embodiment, manager server 102, installs microrouter 404 and network service plug-ins 406 on device 106.

FIGS. 6a-b, 7a-b, 8, 9 10 and 11 illustrate methods 600, 700, 800, 900, 1000 and 1100 for authenticating a cellular message, identifying a cellular device and encrypting/decrypting a cellular message using a short-range radio address according to embodiments of the present invention. In embodiments, methods are performed, in part or completely, by software components illustrated in FIGS. 4-5. In an embodiment of the present invention, a logic block or step illustrated in FIGS. 6a-b, 7a-b, 9, 10 and 11 may represent an execution of a software component, such as a software program, a software object, a software function, a software subroutine, a software method, a software instance, a code fragment singly or in combination. In an alternate embodiment of the present invention, logic block or step represents execution of a software component, hardware operation, or user operation, singly or in combination. In an alternate embodiment of the present invention, fewer or more logic blocks or steps are carried out in the methods illustrated in FIGS. 6a-b, 7a-b, 9, 10 and 11.

Figure 6A:
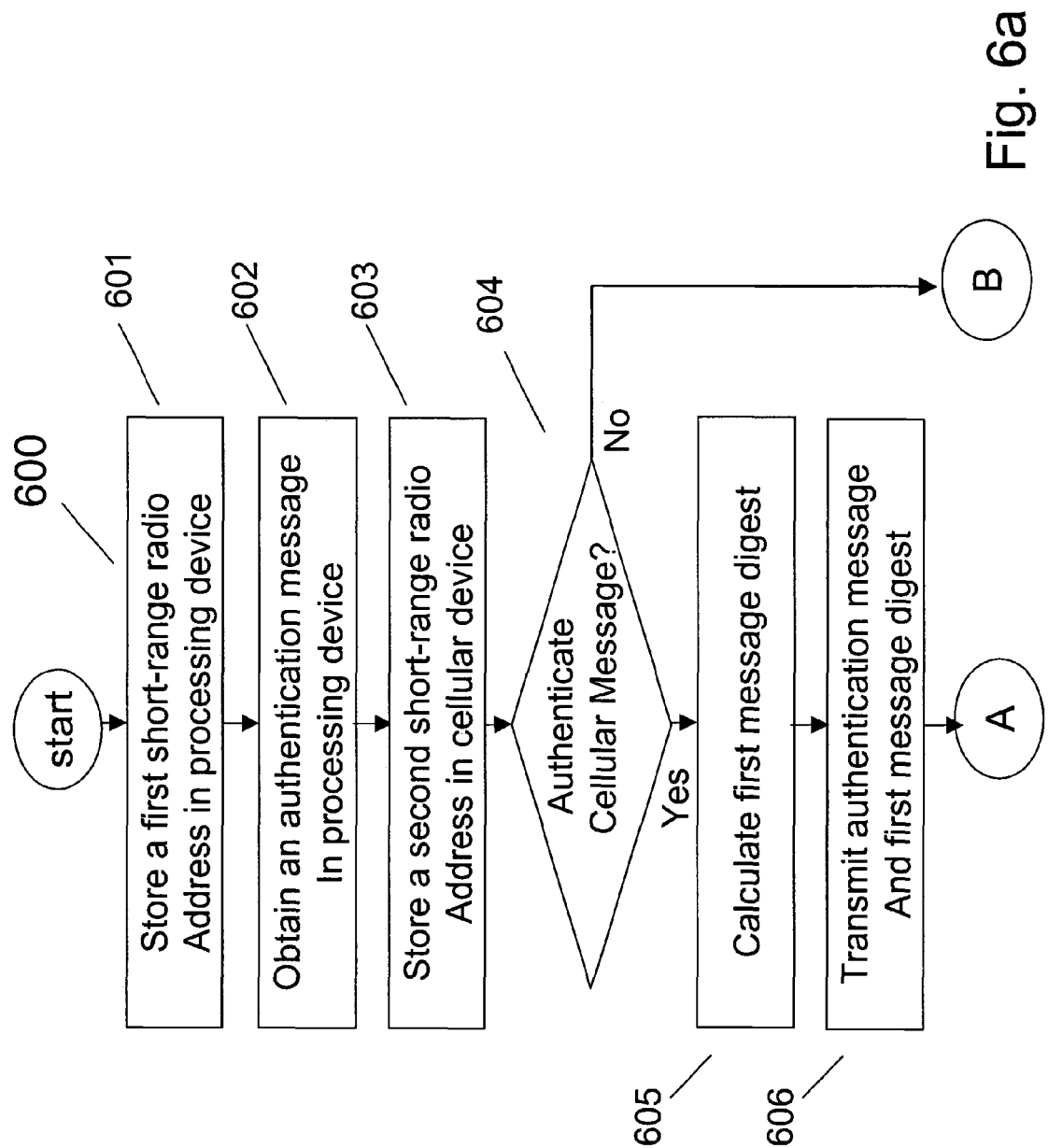

FIGS. 6a-b illustrates a method 600 for authenticating a cellular message according to an embodiment of the present invention. Method 600 begins by storing a first short-range radio address associated with a cellular device in a processing device coupled to a cellular network 129 as illustrated by logic block 601. For example, a short-range radio address associated with device 106 is stored in a processing device, such as Manager server 102. In an embodiment of the present invention, a short-range radio address ("BD_ADDR 1") is stored in cellular device/Bluetooth™ address table 555 in Manager software component 550 as seen in FIG. 5. In an embodiment of the present invention, multiple short-range addresses associated with multiple cellular devices are stored in table 555 by a cellular network operator 115.

An authentication message is obtained as illustrated by logic block 602. Cellular Device Identification and Authentication software component 552 in Manager software 550 stores authentication messages in an embodiment of the present invention. In an alternate embodiment of the present invention, Cellular Device Identification and Authentication software component 552 generates a random authentication message.

In logic block 603, a short-range radio address is stored in a cellular device, such as cellular device 106, and in particular a Bluetooth™ address for a short-range transceiver as seen in FIGS. 1 and 3a. In an embodiment of the present invention, a business entity, such as a manufacturer, stores the short-range radio address in cellular transceiver.

A determination is made whether to authenticate a cellular message as shown by logic block 604. If a cellular message is to be authenticated, control passes to logic block 605; otherwise, method 600 ends.

A first message digest or fingerprint is calculated by Manager software 550, and in particular one-way hash software component 553 as illustrated by logic block 605. In an embodiment of the present invention, Manager software 550, and in particular one-way hash software component 553 calculates a fixed output 128-bit message digest using an authentication message and short-range radio address as inputs. In an embodiment of the present invention, a MD5 software component is used as hash software component 553. An authentication message and the message digest is transmitted by Manager server 101, and in particular by Message Generation and Receive software component 554, on cellular network 129 to device 106 in an embodiment of the present invention.

In logic block 607, a cellular device receives the authentication message and message digest. In an embodiment of the present invention, device 106 receives the authentication message and message digest by cellular signals 111 from cellular network 129.

In logic block 608, device 106 calculates a second message digest using the short-range radio address BD_ADDR 601 stored in device 106 and the received authentication message. In an embodiment of the present invention, IA software 600a includes a one-way hash software component, such as a MD5 software component, to calculate the second message digest using the received authenticate message and reading a short-range radio address BD_ADDR 601 in BT Baseband software component 502. In an embodiment of the present invention, GPRS software component 503, and in particular IA software 600a reads the stored short-range radio address BD_ADDR 601 in BT baseband 502 by executing an instruction or command as described below.

In logic block 609, a determination is made whether the first received message digest matches the calculated second message digest. If the first and second message digests match, the message is authenticated as illustrated in logic block 610; otherwise method 600 ends and the cellular message is not authenticated and ignored by device 106. In logic block 610, the message has been authenticated and device 106 takes the appropriate action based upon the content of the received message.

Figure 7A:
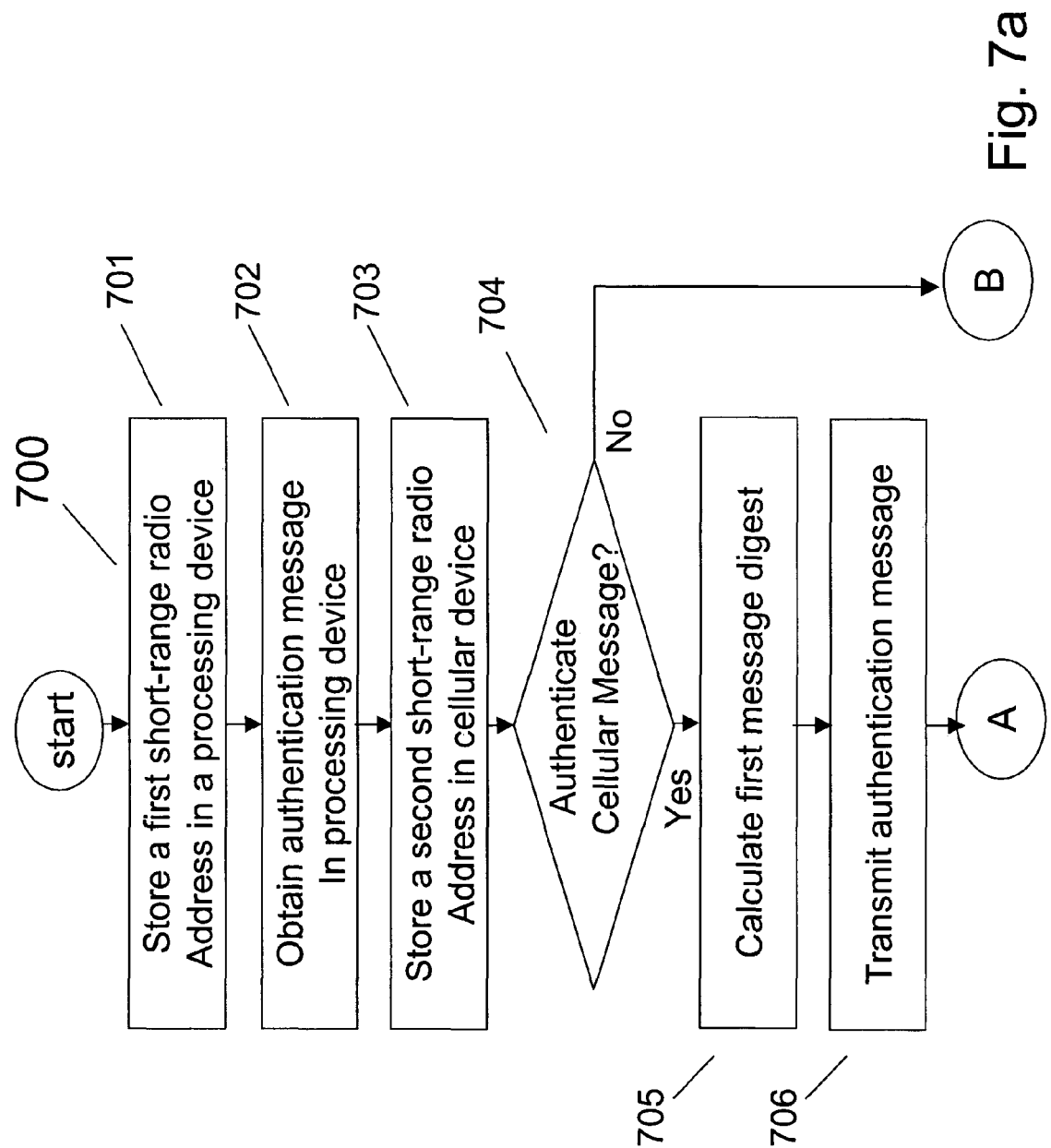
Figure 7B:
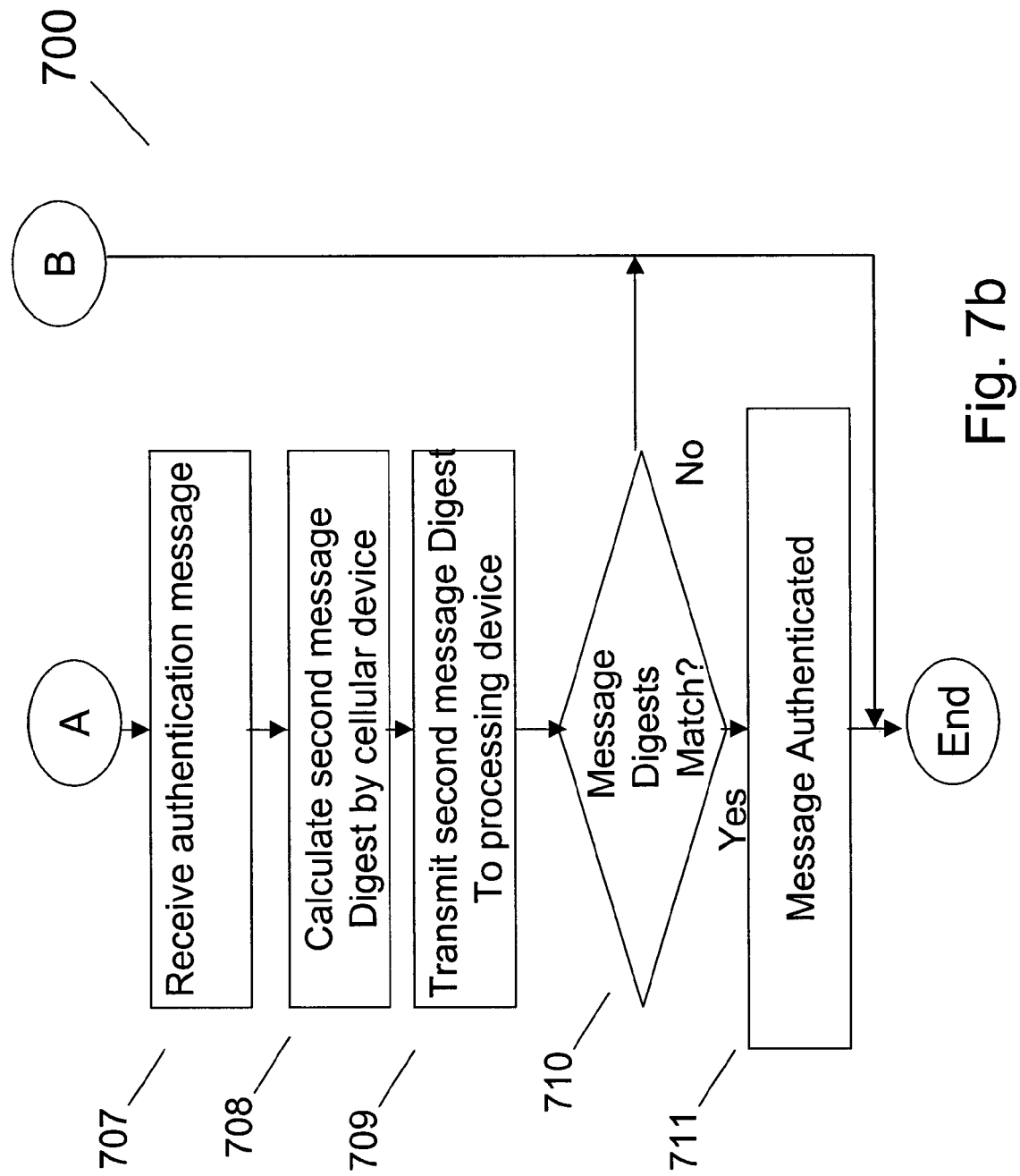

FIGS. 7a-b illustrates a method 700 for authenticating a cellular message according to another embodiment of the present invention. Method 700 begins by storing a first short-range radio address in a processing device, such a Manager server 102, as illustrated by logic block 701.

An authentication message is obtained as illustrated by logic block 702. Cellular Device Identification and Authentication software component 552 in Manager software 550 calculates a random authentication message in an embodiment of the present invention.

In logic block 703, a second short-range radio address is stored in a cellular device, such as cellular device 106, and in particular a Bluetooth™ address for a short-range transceiver as seen in FIGS. 1 and 3a. In an embodiment of the present invention, a business entity, such as a manufacturer, stores the short-range radio address in cellular transceiver.

A determination is made whether to authenticate a cellular message as shown by logic block 704. If a cellular message is to be authenticated, control passes to logic block 705; otherwise, method 700 ends.

A first message digest or fingerprint is calculated and stored by Manager software 550, and in particular one-way hash software component 553 as illustrated by logic block 705. In an embodiment of the present invention, Manager software 550, and in particular one-way hash software component 553 calculates a fixed output 128-bit first message digest using an authentication message and the first short-range radio address as inputs. In an embodiment of the present invention, a MD5 software component is used as hash software component 553.

The authentication message is transmitted by Manager server 101 as shown by logic block 706, and in particular by Message Generation and Receive software component 554, on cellular network 129 to device 106 in an embodiment of the present invention.

In logic block 707, a cellular device receives the authentication message. In an embodiment of the present invention, device 106 receives the authentication message by cellular signals 111 from cellular network 129.

In logic block 708, device 106 calculates a second message digest using the short-range radio address BD_ADDR 601 stored in device 106 and the received authentication message. In an embodiment of the present invention, IA software 600a includes a one-way hash software component, such as a MD5 software component, to calculate the second message digest using the received authenticate message and reading a short-range radio address BD_ADDR 601 in BT Baseband software component 502. In an embodiment of the present invention, GPRS software component 503, and in particular IA software 600a reads the stored short-range radio address BD_ADDR 601 in BT baseband 502 by executing an instruction or command as described herein.

In logic block 709, a cellular device transmits a second digest message and an authentication message to the processing device.

In logic block 710, the processing device makes a determination whether the calculated first message digest matches the received second message digest from the cellular device. If the first and second message digests match, the message is authenticated as illustrated in logic block 711; otherwise method 700 ends and the cellular message is not authenticated and ignored by the processing device.

FIG. 8 illustrates a method 800 for identifying a cellular device according to an embodiment of the present invention. Method 800 begins by storing a short-rang radio address associated with a cellular device in a processing device coupled to a cellular network as illustrated by logic block 801. For example, a short-range radio address associated with device 106 is stored in a processing device, such as Manager server 102. In an embodiment of the present invention, a short-range radio address ("BD_ADDR 1") is stored in cellular device/Bluetooth™ address table 555 in manager software 550 as seen in FIG. 5. In an embodiment of the present invention, multiple short-range addresses associated with multiple cellular devices are stored in table 555 by a cellular network operator 115.

In logic block 802, a determination is made whether to identify a cellular device. In an embodiment of the present invention, Cellular Device Identification and Authentication software component 552 determines whether a cellular device must be identified. If a cellular device needs to be identified, control passes to logic block 803

In logic block 803, a first cellular message requesting a cellular device identifier is transmitted. In an embodiment of the present invention, Manager server 102 causes cellular network 129 to transmit cellular signals 111 including the request for the cellular device identifier.

In logic block 804, a cellular device, such as device 106, receives the cellular message requesting the cellular device identifier.

A cellular device reads a short-range radio address from the cellular device, responsive to the first cellular message request, as illustrated by logic block 805 and the cellular device transmits a second cellular message including the short-range radio address to identify the cellular device to Manager server 102 as illustrated by logic block 806.

In logic block 807, a processing device, such as Manager server 102 receives the second cellular message and compares the received short-range radio address with the stored short-range radio address in order to identify the cellular device. If the received short-range radio address matches the stored short-range radio address, Manager server 102 has identified the cellular device and thus may transmit and receive further cellular messages.

FIG. 9 illustrates a method 900 for identifying a cellular device according to an embodiment of the present invention. Method 900 begins by storing a short-rang radio address associated with a cellular device in a processing device, such as manager server 102, coupled to a cellular network as illustrated by logic block 901.

In logic block 902, a determination is made whether to identify a cellular device. In an embodiment of the present invention, Cellular Device Identification and Authentication software component 552 determines whether a cellular device must be identified. If a cellular device needs to be identified, control passes to logic block 903

In logic block 903, a first cellular message including the stored short-range radio address in a processing device is transmitted to the cellular device. In an embodiment of the present invention, Manager server 102 causes cellular network 129 to transmit cellular signals 111 including the stored short-range radio address.

In logic block 904, a cellular device, such as device 106, receives the cellular message including the stored short-range radio address.

A cellular device reads a short-range radio address from the cellular device, responsive to the first cellular message, as illustrated by logic block 905.

A cellular device compares the short-range radio address stored in the cellular device with the short-range radio received in the first cellular message as illustrated by logic block 906.

A cellular device generates a second cellular message to the Manager server 102 responsive to the comparison of the short-range radio addresses as illustrated by logic block 807. The second cellular message transmitted to Manager server 102 includes a message confirming the identity of the cellular device in an embodiment of the present invention.

Figure 10:
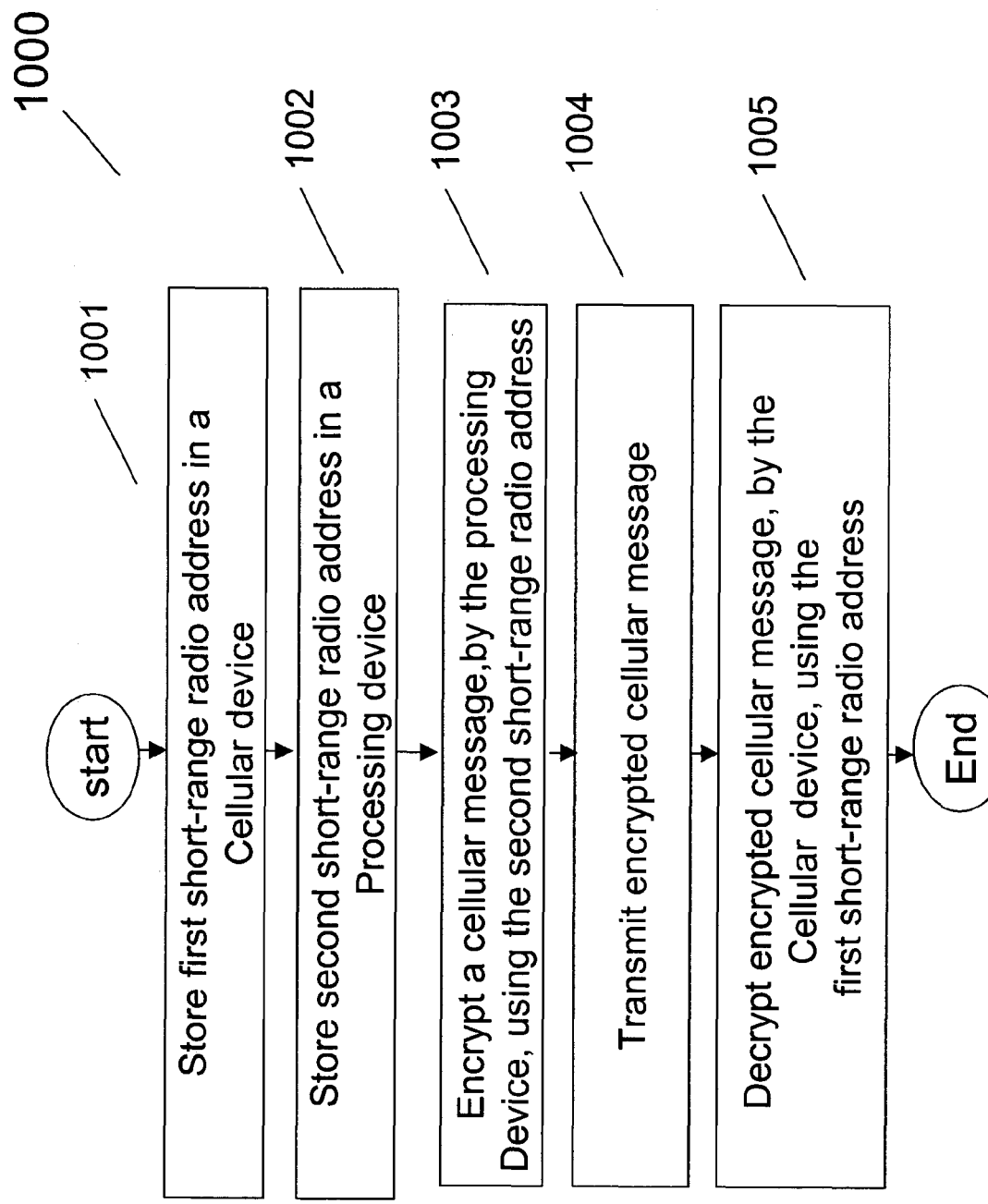

FIG. 10 illustrates a method 1000 for encrypting and decrypting a cellular message according to an embodiment of the present invention. Method 1000 begins by storing a first short-range radio address in a cellular device as illustrated by logic block 1001. Similarly, a second short-range radio address, which is the same as the first short-range radio address, is stored in a processing device, such as a Manager server 102, as illustrated by logic block 1002. A cellular message is encrypted by a processing device using the second short-range radio address, as a key, as shown by logic block 1003. An encrypted cellular message is transmitted by the processing device to the cellular device as illustrated by logic block 1004. The encrypted cellular message, received by the cellular device, is decrypted using the first short-range radio address as a key, as shown by logic block 1005, and method 1000 ends.

Figure 11:
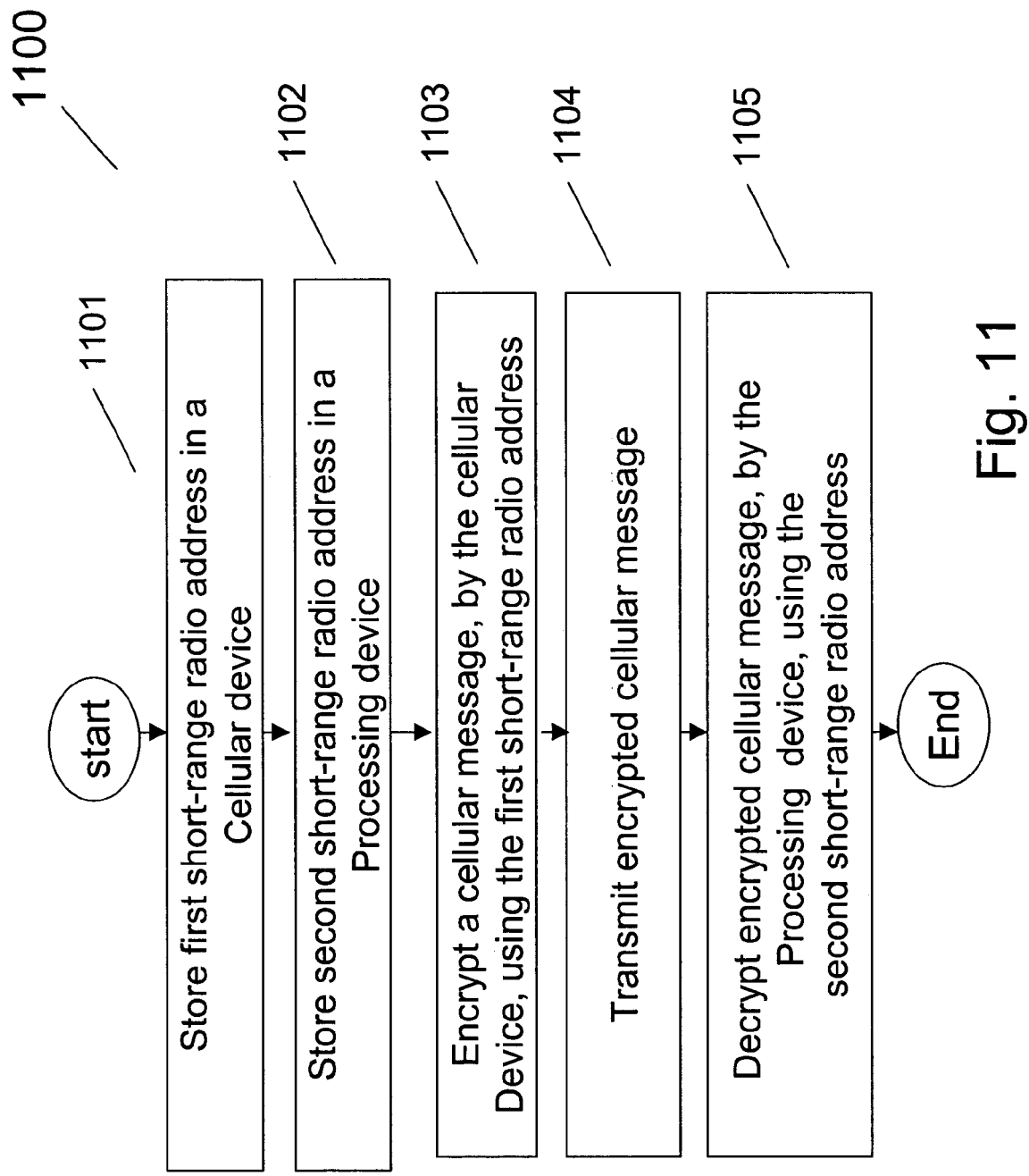

FIG. 11 illustrates a method 1100 for encrypting and decrypting a cellular message according to an embodiment of the present invention. Method 1101 begins by storing a first short-range radio address in a cellular device as illustrated by logic block 1101. Similarly, a second short-range radio address, which is the same as the first short-range radio address, is stored in a processing device, such as a Manager server 102, as illustrated by logic block 1102. A cellular message is encrypted by a cellular device using the first short-range radio address, as a key, as shown by logic block 1103. An encrypted cellular message is transmitted by the cellular device to the processing device as illustrated by logic block 1104. The encrypted cellular message, received by the processing device, is decrypted using the second short-range radio address as a key, as shown by logic block 1105, and method 1100 ends.

IV. Manager Server

In an embodiment of the present invention, Manager server 107, illustrated in FIG. 1, stores and executes Manager software component 550 illustrated in FIG. 5. In an embodiment of the present invention, Manager software component 550 is used authenticate cellular messages, encrypt/decrypt cellular messages and identify cellular devices, such as device 106 shown in FIG. 1.

Manager server 102 includes a Proliant server available from Compaq® Computer Corporation of Houston, Tex. having a Windows® 2000 operating system available from Microsoft® Corporation in an embodiment of the present invention.

Manager software component 550 includes at least three software components: Cellular Message Generation and Receive software component 554, Cellular Device Identification and Authentication software component 552 including one-way hash software component 553 and Cellular Device/Short-Range Radio (Bluetooth) Address table 555, in an embodiment of the present invention.

Cellular Message Generation and Receive software component 554 is responsible for causing Manager server 102 to generate and receive cellular messages, by way of cellular signals 111, on cellular network 129 to and from cellular devices, such as cellular device 106. In an embodiment of the present invention, Cellular Message Generation and Receive software component 552 generates and receives encrypted cellular messages. In an embodiment of the present invention, Cellular Message Generation and Receive software component 554 generates and receives cellular messages responsive to information received from Cellular Device Identification and Authentication software component 552.

Cellular Device Identification and Authentication software component 552 is responsible for storing authentication messages and generating message digests or fingerprints using table 555, and in particular using short-range radio addresses associated with a cellular device to be identified or a cellular message to be authenticated. Cellular Device Identification and Authentication software component 552 includes a one-way hash software component; such as a MD5 software component for generating a fixed output 128-bit message digest or fingerprint based on a authentication message and associated stored short-range radio address in table 555.

Cellular Device/Short-Range Radio (i.e. Bluetooth™) Address table 555 includes columns 555*a* and 555*b* storing named cellular devices ("Cellular Device 1") and associated short-range radio addresses ("BD_ADDR 1"), respectively. A cellular network operator 115 in an embodiment of the present invention stores the named cellular devices and associated short-range radio addresses.

Cellular Device Identification and Authentication software component 552 also includes a software component for randomly generating an authentication cellular message in an embodiment of the present invention.

Cellular Device Identification and Authentication software component 552 also includes an Encryption/Decryption software component for encrypting and decrypting, respectively, cellular messages using a short-range radio address in table 555, as a key. For example, if a cellular device 1 is transmitting encrypted cellular messages, Cellular Device Identification and Authentication software component 552, in particular an Encryption/Decryption software component uses short-range radio address BD_ADDR 1 as a key in decrypting the cellular message. Encrypted cellular messages to be transmitted to a predetermined cellular device, such as cellular device 1, are likewise constructed using a short-range radio address, such as BD_ADDR 1, associated with the cellular device in table 555 as a key.

V. Conclusion

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A method comprising:

storing in a processing device a first short-range radio address associated with a short-range radio transceiver embedded in a cellular device, wherein the processing device manages authentication and identification of messages communicated to a cellular device from said processing device, independent from a communication protocol used to communicate the messages;

obtaining an authentication message using the processing device;

providing a second short-range radio address associated with said short-range radio transceiver to be stored in the cellular device, wherein the first short-range radio address and the second short-range radio address are the same;

calculating, using the processing device, a first message digest responsive to the authentication message and a first short-range radio address;

transmitting, over a cellular network coupled to the processing device, a cellular message comprising the authentication message and the first message digest;

wherein the cellular message is received by the cellular device;

calculating a second message digest responsive to the authentication message and the second short-range radio address; and, wherein the cellular device compares the first message digest with a second message digest to authenticate the cellular message.

2. The method of claim 1, wherein the authentication message is randomly calculated.

3. The method of claim 1, wherein the first message digest is a 128-bit value calculated by a one-way hash software component.

4. The method of claim 3, wherein the one-way hash software component is a MD5 software component.

5. The method of claim 1, wherein the first and second short-range radio addresses each comprise a Bluetooth™ address.

6. The method of claim 1, wherein the cellular device is in a short-distance wireless network.

7. The method of claim 6, wherein the cellular device is in a short-distance wireless network.

8. The method of claim 6, wherein the short-distance wireless network is an 802.11 wireless local area network.

9. The method of claim 1, wherein the first and second short-range radio addresses are 48-bit values.

10. The method of claim 1, wherein the cellular device is a cellular telephone.

11. The method of claim 1, wherein the processing device is a server.

12. A method for authenticating a message communicated from a cellular device to a processing device using a short-range radio address, the method comprising:

storing a first short-range radio address, associated with a short-range radio transceiver embedded in a cellular device, in a processing device wherein the processing device manages authentication and identification of messages communicated to a cellular device from the processing device, independent from a communication protocol used to communicate the messages;

obtaining an authentication message in the processing device;

storing a second short-range radio address, associated with said short-range radio transceiver, in the cellular device, wherein the first short-range radio address and the second short-range radio address are the same;

calculating, by the processing device, a first message digest responsive to the authentication message and first short-range radio address;

transmitting, over a cellular network coupled to the processing device, a cellular message including the authentication message to the cellular device;

calculating a second message digest responsive to the authentication message and the second short-range radio address;

wherein the second message digest is transmitted by the cellular device; and, comparing, by the processing device, the first message digest to a second message digest to authenticate the cellular message.

13. A universal method for encrypting and decrypting a cellular message communicated from a processing device to a cellular device using a short-range radio address associated with a short-range radio transceiver embedded in said cellular device, the method comprising:

storing a first short-range radio address associated with said short-range radio transceiver in the cellular device;

storing a second short-range radio address associated with said short-range radio transceiver in a processing device, wherein the first short-range radio address and the second short-range radio address are the same;

encrypting the cellular message, by the processing device, using the second short-range radio address;

transmitting, over a cellular network coupled to the processing device, the encrypted cellular message to the cellular device; and decrypting the encrypted cellular message, by the cellular device, using the first short-range radio address.

14. A universal method for encrypting and decrypting a cellular message communicated from a cellular device to a processing device using a short-range radio address associated with a short-range radio transceiver embedded in said cellular device, the method comprising:

storing a first short-range radio address associated with said short-range radio transceiver in a cellular device;

storing a second short-range radio address associated with said short-range radio transceiver in a processing device, wherein the first short-range radio address and the second short-range address are the same;

encrypting the cellular message, by the cellular device, using the first short-range radio address;

transmitting, over a cellular network coupled to the cellular device, the encrypted cellular message to the processing device; and decrypting the encrypted cellular message, by the processing device, using the second short-range radio address.

15. A universal method for identifying a cellular device comprising the steps of:

receiving, by the cellular device, a first message requesting a cellular device identifier;

reading, by the cellular device, a first short-range radio address associated with a short-range radio transceiver embedded in said cellular device;

transmitting, by the cellular device, over a cellular network coupled to the cellular device, a second cellular message including the first short-range radio address;

storing a second short-range radio address associated with said short-range radio transceiver in a processing device which is independent of communication protocol used to communicate the first and second cellular messages; and, comparing the first short-range radio address to the second short-range radio address to uniquely identify the cellular device.

16. The method of claim 15, wherein the first and second short-range radio addresses are Bluetooth™ addresses.

17. The method of claim 15, wherein the cellular device is in a short-distance wireless network.

18. The method of claim 17, wherein the short-distance wireless network is a Bluetooth™ wireless network.

19. The method of claim 15, wherein the short-distance wireless network is an 802.11 wireless local area network.

20. The method of claim 15, wherein the reading step includes executing a host controller command.

21. The method of claim 20, wherein the host controller command is HCI_Read_BD_ADDR and the short-range radio address is BD_ADDR.

22. The method of claim 15, wherein the first and second short-range radio addresses are 48-bit values.

23. The method of claim 15, wherein the cellular device is a cellular telephone.

24. The method of claim 15, further comprising the steps of receiving a third cellular message responsive to the second cellular message.

25. The method of claim 24, wherein the first, second and third cellular messages are generated by a cellular network coupled to a processing device storing the second short-range radio address corresponding to the cellular device.

26. The method of claim 15, wherein the first, second and third cellular messages are in a Global System for Mobile communications ("GSM") protocol.

* * * * *